HIGH SPEED PULSE FORMING NETWORK INCLUDING CONSTANT CURRENT GROUNDED BASE TRANSISTOR

Filed July 3, 1962

INVENTORS
JAMES N. COLE
HENRY R. FOGLIA
JAMES R. KISEDA

BY Roy R. Schlemmer
ATTORNEY 3,215,855

HIGH SPEED PULSE FORMING NETWORK INCLUDING CONSTANT CURRENT GROUNDED BASE TRANSISTOR

James N. Cole, Peekskill, Henry R. Foglia, Briarcliff Manor, and James R. Kiseda, Yorktown Heights, N.Y., assignors to International Business Machines Corporation, New York, N.Y., a corporation of New York Filed July 3, 1962, Ser. No. 207,283
6 Claims. (Cl. 307—88.5)

The present invention relates to a pulse forming network. More particularly it refers to a transistorized circuit for producing pulses having extremely fast rise times together with high repetition rates.

In present day electronic computer technology there is a constant demand for faster and still faster data handling methods and apparatus. New devices and circuits are continually being developed which decrease the time necessary to perform the various operations performed in the computer.

The new thin magnetic film memories have themselves greatly increased the over-all capacity and speed of computer memories. It is characteristic of these memories to be extremely small and very fast in their switching response or speed. However, they need rather substantial currents to perform the switching operation. Accordingly, a great deal of research has been done to develop pulse forming circuits capable of producing driving (read and write) pulses for such memories which realize both the speed potential of the memories and at the same time are of sufficient magnitude to drive the individual elements from one remanent magnetic state to the other.

The usual problem encountered in producing a short duration pulse having a substantial magnitude is that both the leading and trailing edges tend to have considerable slope due primarily to the time constant of the circuit components involved as well as the instability of width and amplitude resulting from conventional acts. Secondly, there is the problem of providing a high energy source capable of discharging in sufficiently short time to produce the pulse through whatever shaping circuits may be employed.

It has now been found that a very satisfactory high repetition rate fast rise time pulse can be formed by utilizing a delay line as an energy storage element, providing means to charge said delay line and triggering the said delay line with a first transistor and passing the output pulse from said delay line with a second grounded base transistor. Thus, a pulse shaping circuit having an absolute minimum of components is disclosed which provide extremely short duration high rise time pulses.

It is accordingly a primary object of the present invention to provide a circuit capable of producing a high repetition rate fast rise time pulse train.

It is a further object to produce such a circuit wherein the pulse width and amplitude of the pulses can be closely controlled.

It is a still further object to provide such a circuit comprising a delay line, and two transistors having a minimum number of auxiliary components.

The foregoing and other objects, features and advantages of the invention will be apparent from the following more particular description of preferred embodiments of the invention, as illustrated in the accompanying drawings.

The objects of the present invention are accomplished in general by a pulse shaping circuit comprising a delay line, means for charging said delay line, means including a transistor coupled to the input circuit of said delay line, said means being triggerable to discharge said delay line through an output circuit, said output circuit including a second transistor in grounded base configuration connected to provide a constant current output source for said circuit.

The circuit of the present invention is capable of providing a very high repetition rate pulse train having relatively steep slopes which are especially suited for driving magnetic memory arrays of computers. The circuit has particular utility in that the pulse width may be relatively easily controlled by varying the length of the delay line and the amplitude conveniently varied by varying the magnitude of the charging pulse and supply voltage at 34. As will be seen from the subsequent discussion, the charging pulse and triggering pulses may have rather sloppy or unprecise waveforms while the output will have a very precise sharply defined waveform suitable for the purposes intended.

Figure 1:
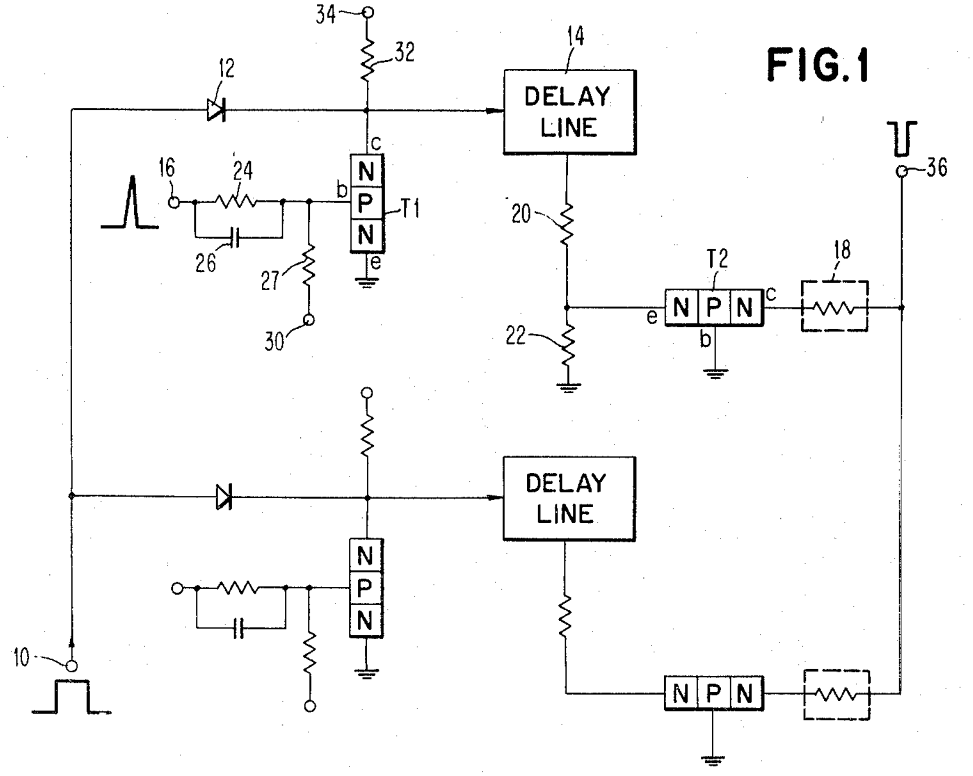
FIGURE 1 is a schematic diagram of a pulse shaping circuit constructed in accordance with the present invention.

Referring more specifically to the drawings, FIGURE 1 shows a portion of a network suitable for driving the read-write lines of a magnetic memory constructed in accordance with the present invention. It will be seen that there are only two of the circuits shown. Actually there would be far more than this number to drive a typical magnetic storage array. Since all of these circuits are the same, only the upper circuit of FIGURE 1 will be specifically described as all operate substantially identically.

In operation, a charge or regenerate pulse is supplied to the circuit at terminal 10, this pulse is fed through an isolating diode 12 and is coupled to one side of delay line 14. At a finite time after the delay line has had time to charge, a trigger pulse is supplied to terminal 16 which is connected through an appropriate R-C circuit to the base of transistor $T_1$. This trigger pulse causes transistor $T_1$ to conduct and the delay line 14 to discharge through the emitter base circuit of transistor $T_2$. Transistor $T_2$ is connected in grounded base configuration and, as is well known, acts as a constant current source for the load 18 connected in the collector circuit thereof. $T_2$ will conduct in accordance with the signal from the delay line 14 applied to the emitter of transistor $T_2$ responsive to the application of a trigger pulse to transistor $T_1$. The use of transistor $T_2$ in the output circuit provides a constant current source for its load when connected in the grounded base configuration so that when the load varies somewhat a constant driving current will still be provided within reasonable limits to provide precise driving current for the various magnetic elements. It should be here noted that the load 18 would normally comprise the drive lines of the magnetic memory.

Figure 2:
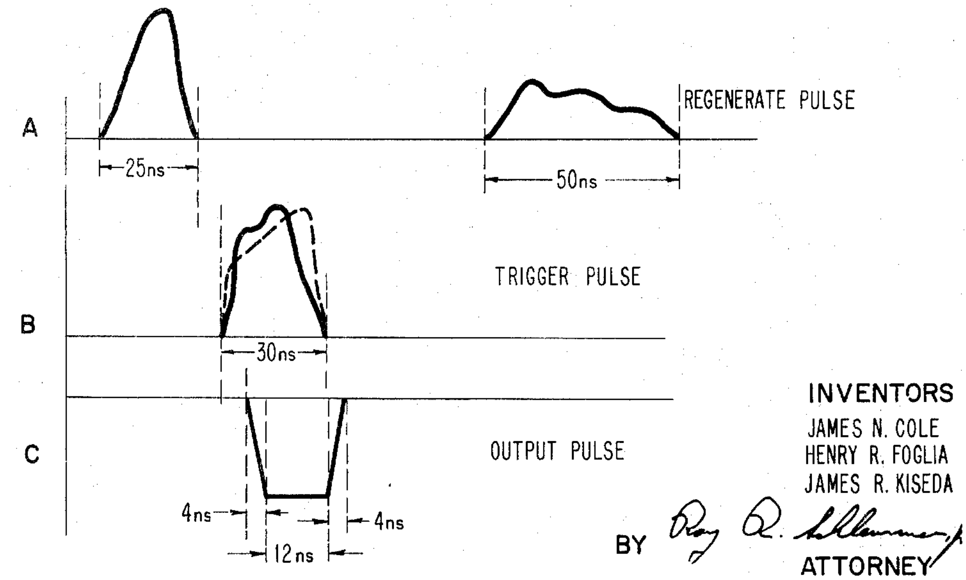
FIGURE 2 is a graph illustrating typical waveforms of the regenerate, trigger and output pulses obtained with the instant circuit.

Referring now to FIGURE 2, the waveforms of the regenerate, trigger and output pulses will be discussed. Waveform A shows two possible regenerate pulse waveforms which could be utilized to charge the delay line 14. Waveform 1 shows a relatively short duration pulse of 25 nanoseconds having a first amplitude while waveform 2 shows a pulse of 50 nanoseconds having only half the amplitude of the first waveform. Either one of these pulses would be satisfactory for charging the delay line as the important factor is the total area under the curve. As is well known, the charging of a delay line is not unanalogous to the charging of the capacitor such that with waveform 1 the delay line would charge at a more rapid rate for a shorter length of time thus giving the approximate same total charge stored as for the second waveform where the rate would be slower but the time for charging is approximately double. It will be noted that the shape of these two waves is quite ragged and irregular and is somewhat typical of the output of conventional multivibrator sources which would be used to provide these pulses. Such pulses by themselves would be grossly inadequate to drive the windings of a magnetic storage device if optimum results were desired.

Waveform B shows typical shapes for the trigger pulse which would be supplied at point 16 to render transistor $T_1$ conducting. As will be noted from the two waveforms shown, the shape requirements for this pulse are likewise not overly critical with the present circuit since the only requirement for the pulse be that it initiate conduction in transistor $T_1$ at the precise time demanded by other circuit considerations and that it render the transistor $T_1$ conducting for at least as long as it takes the delay line 14 to discharge. The trigger source pulses would likewise conventionally be supplied from controlled multivibrators or the like capable of producing the desired trigger pulse sequence.

Waveform C shows a typical output pulse obtained with the present invention taken across the load 18. It will be noted that the output pulse is delayed slightly relative to the trigger pulse as a short amount of time is required for the magnitude of the trigger pulse to drive the transistor $T_1$ into conduction. The pulse width of the output pulse is governed solely by the physical characteristics of the delay line as will be discussed more fully subsequently. The extremely short rise and decay times of four nanoseconds are realized due to the fact that the delay line has virtually no rise or decay delay and the only delay occasioned in the circuit is that of the turn-on delay of $T_1$ which is short and the inherent inductance and capacitance of the passive elements on decay, which elements in the present circuit have been kept to an absolute minimum.

The specific circuit elements utilized to obtain the disclosed output pulses were as follows. Transistors $T_1$ and $T_2$ were both I.B.M. type 6A2 npn transistors. The delay line used was an Amphenol RG50 coaxial cable which has a characteristic impedance of 50 ohms. Four sections of said coaxial cable were connected in parallel to give an overall characteristic impedance of 12½ ohms. Resistor 20 was selected to be 10 ohms which together with the resistance of transistor $T_1$ and the emitter-base resistance of transistor $T_2$ make up approximately a total of 12½ ohms which closely matches the output resistance for the discharge path of said delay line. As is well known in the art, the discharge time for such a delay line is proportional to the total length of same. For the particular Amphenol RG50 delay line utilized the discharge time in nanoseconds is twice the length of said delay line in feet. Thus, with a delay line length of 10 feet a 20 nanosecond output pulse width is obtainable. It will be apparent to one skilled in the art in view of the teachings set forth that other types of delay lines having suitable discharge times could be readily substituted for the Amphenol RG50 delay line disclosed. For such a 20 nanosecond output pulse the half slope pulse width of the trigger pulse would have to exceed this slightly to insure that the transistor $T_1$ was turned on with sufficient time to allow the delay line to completely discharge. As stated previously, the fact that the transistor $T_1$ is conductive for slightly longer than it takes the delay line to discharge has no effect on the output pulse as there is no more signal in the delay line to be discharged.

Referring now more specifically to current flow in the instant circuit during charging of the delay line, current flows from the regenerate pulse source through the diode 12 into the delay line through the resistor 20 and resistor 22 down through ground and back through the grounded connection of the regenerate pulse source. The resistor 22 should be in the neighborhood of 100 ohms to provide a charging path without affecting the current flow through the emitter base circuit of transistor $T_2$ during discharge of the delay line.

The discharge cycle is initiated when the trigger pulse is fed to transistor $T_1$ through point 16 and the input network comprising resistor 24 and capacitor 26. The base of transistor $T_1$ is supplied with a small negative potential, for example, −5 volts through resistance 27. When transistor $T_1$ is driven into conduction, the delay line 14 discharges through resistor 20, the emitter base junction of transistor $T_2$ through the ground and back up through transistor $T_1$ which discharge continues until the charge is completely removed from delay line 14. Discharge of the delay line 14 applying the signal to the emitter base junction of transistor $T_2$ and by transistor action causes current flow in the collector circuit thereof as long as a signal appears at the emitter. The output current of transistor $T_2$ flows through the load 18 and through the positive bias source applied at point 36 through the grounded portion of said bias source 36. The transistor $T_2$ functions as a constant current source for the output circuit which allows considerable flexibility to the design whereby the load 18 could vary somewhat depending upon the number of winding cores and their respective back E.M.F.'s being driven by the circuit and still maintain approximately the same current through said core windings regardless of the number. This type of operation of a grounded base transistor is well known in the art.

With the circuit of the instant invention a very precise controllable drive pulse for magnetic memories has been obtained. It is able to use rather sloppily shaped regenerate and trigger pulses and with the use of a minimum quantity of circuitry obtains very excellent results. The use of a delay line as opposed to some other sort of storage means provides superior rise and decay times relative to, for example, a capacitor storage circuit where the conventional RC charge and discharge slopes of the capacitor would limit the minimum rise and decay times obtainable.

The instant circuit is operable at pulse repetition rates of up to 10 megacycles per second. This may be contracted with pulse repetition rates in commercially available delay line trigger source circuits using electromagnetic relays actuated by a mercury commutator to discharge the line at 100 cycles per second. The instant circuit also has frequencies substantially higher than conventional electronic types of pulse sources of the monostable multivibrator type capable of providing comparable frequency, amplitude and pulse width control.

It may thus be seen that the circuit of the present invention represents an important contribution to the electronic art. With the present circuit simultaneous control over virtually all of the pulse parameters, i.e., repetition rate, rise and decay times, pulse width and amplitude may be achieved in a relatively simple and inexpensive circuit arrangement.

While the invention has been particularly shown and described with reference to preferred embodiments thereof, it will be understood by thoses killed in the art that various changes in form and details may be made therein without departing from the spirit and scope of the invention.

What is claimed is:

1. A circuit for supplying high repetition rate pulses to a load comprising (a) a delay line, (b) means for charging said delay line, (c) means including a first transistor for discharging said delay line when conductive, (d) means for selectively rendering said first transistor conductive, and (e) a substantially constant current source means including a second grounded base transistor connected in the discharge circuit of said delay line and said load being connected in the collector path of said second transistor.

2. A circuit as set forth in claim 1, wherein the discharge path for said delay line includes the emitter-base junction of said second transistor.

3. A circuit as set forth in claim 2, wherein the discharge path for said delay line including the emitter-collector impedance of said first transistor, the emitter-base impedance of said second transistor and an impedance connected between one side of said delay line and the emitter of said second transistor are substantially equal the characteristic impedance of said delay line.

4. A high repetition rate fast rise time pulse shaping network comprising (a) a delay line,
(b) a pulse source for charging said delay line,
(c) a first transistor selectively actuable to discharge said delay line when in its conductive state,
(d) a trigger pulse source for rendering said first transistor conductive,
(e) a substantially constant source means including a second grounded base transistor connected so that its emitter and base lie in the discharge circuit of said delay line,
(f) a load connected in the collector circuit of said second transistor and
(g) a bias means for supplying collector bias to both of said transistors and base bias to said first transistor.

5. A high repetition rate fast rise time pulse shaping network comprising (a) a delay line energy storage network,
(b) a regenerate pulse source for selectively charging said delay line,
(c) a first transistor connected between the input to said delay line and ground,
(d) a trigger pulse source connected to the base of said first transistor for selectively rendering said first transistor conductive, (e) a substantially constant current source means including a second transistor connected in grounded base configuration having its emitter connected to the output of said delay line through a proper terminating impedance,
(f) a second impedance connected between the emitter of said second transistor and ground having a magnitude several times greater than the characteristic impedance of said delay line for providing a charge path for said delay line,
(g) a load connected in the collector circuit of said second transistor and
(h) bias means for supplying collector bias to both of said transistors and base bias to said first transistor.

6. A circuit for supplying fast rise time pulses to a load comprising:

(a) a delay line,
(b) pulse supply means for charging said delay line in non-time coincidence with any discharge thereof,
(c) a transistor switch circuit for selectively discharging said delay line, and
(d) constant current means including a grounded base transistor circuit means located in said delay line discharge path wherein the discharge current from the delay line flows in the emitter base circuit of said grounded base transistor circuit means and the load is connected in the collector circuit thereof whereby current flows in said collector circuit when said delay line is discharged through the emitter base circuit.

References Cited by the Examiner

UNITED STATES PATENTS

| | | | |
|---|---|---|---|
| 2,830,199 | 4/8 | Mofenson | 307—88.5 |
| 2,942,191 | 6/60 | Welty | 328—67 |
| 2,947,884 | 8/60 | Horodyski | 328—67 |
| 2,967,275 | 1/61 | Brown | 328—67 |

ARTHUR GAUSS, *Primary Examiner.*